May 19, 1970
E. BEER ET AL
3,513,082
ELECTRODE SYSTEM
Original Filed Jan. 29, 1964
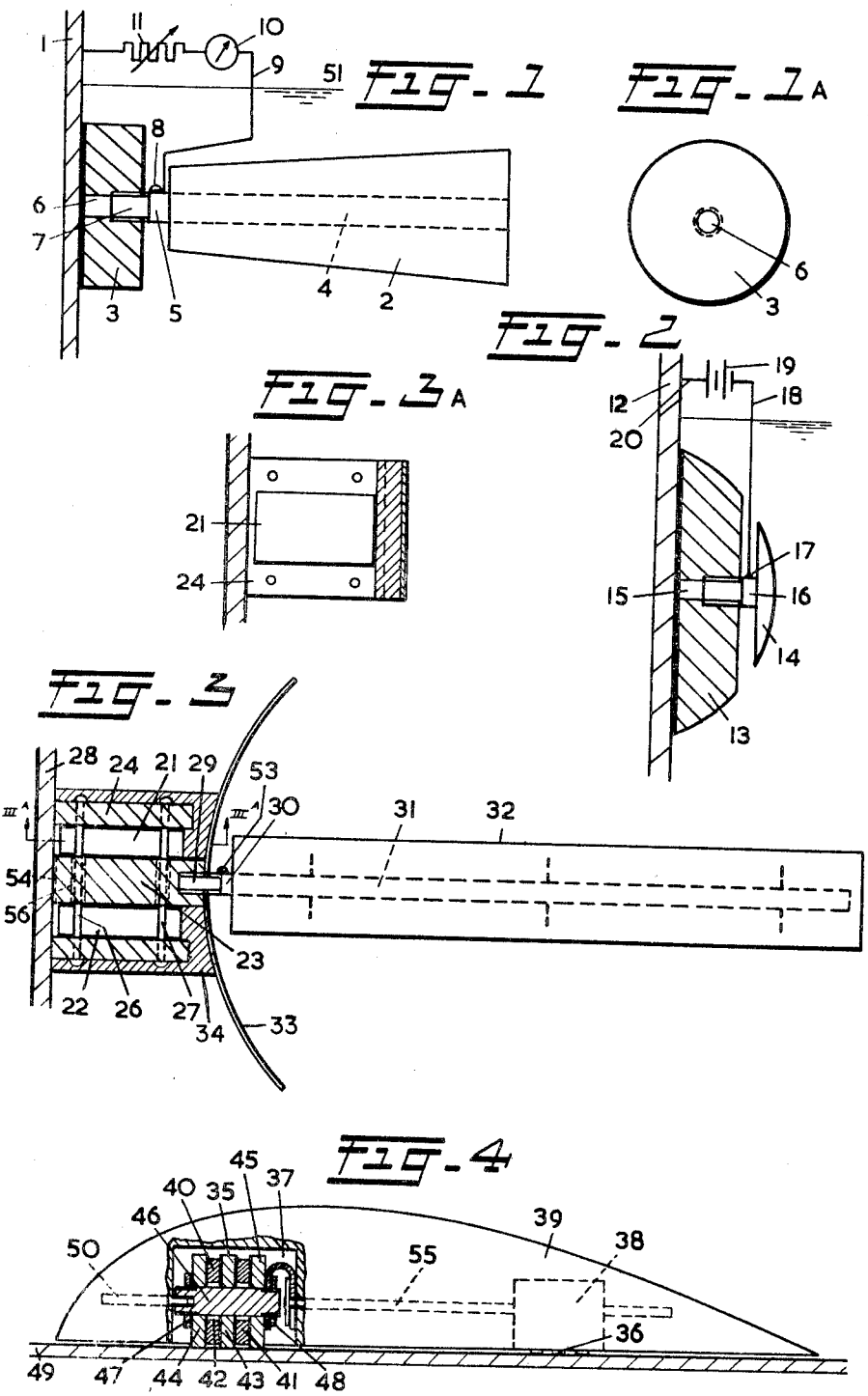
INVENTORS
Ernst Beer and
Henri Bernard Beer
BY Wenderoth, Lind & Ponack
attorneys

3,513,082
ELECTRODE SYSTEM
Ernst Beer, Stadzijde 22, The Hague, and Henri Bernard Beer, Nassaulaan 137, Schiedam, Netherlands
Continuation of application Ser. No. 341,003, Jan. 29, 1964. This application Sept. 1, 1967, Ser. No. 665,178
Claims priority, application Netherlands, Feb. 4, 1963, 288,527
Int. Cl. C23f 13/00
U.S. Cl. 204—148                                   5 Claims

ABSTRACT OF THE DISCLOSURE

An electrode system for cathodically protecting an iron and/or steel object against corrosion in an electrolyte system comprising a ceramic magnet consisting of iron-barium oxides or iron-lead oxides provided with a pole shoe of a material similar to the material of the object to be protected, an electrode being secured to the object to be protected by means of said magnet. The electronic connection of the electrode with the object to be protected is established via the pole shoes of the magnet. The magnets are magnetized in the direction of their thickness, and the conversion of $Fe_2O_3$ into $Fe_3O_4$ is furthered by the use of such magnets.

---

This application is a continuation of application Ser. No. 341,003, filed Jan. 29, 1964, now abandoned.

The present invention relates to an electrode system for protecting a metal object against corrosion in an electrolyte.

The invention relates particularly to electrodes of zinc aluminium, magnesium, platinum, platinum-coated titanium, which are magnetically secured to ferro-magnetic metals, such as steel, steel compounds, nickel, cobalt, for protecting these metals cathodically against corrosion in electrolytes, such as sea-water, brackish water, ground-water, cooling-water, boiler-water and the like.

The cathodic protection of ferro-magnetic metals by means of electrodes is inter alia known from Netherlands Pats. 36,564, 72,206, 74,279 and 81,577, German Pat. 644,418, U.S. Pats. 2,766,200, 2,863,819 and 3,011,959, French Pat. 1,271,669 and British Pat. 870,086.

It is known to fasten all sorts of articles to a ferro-magnetic base by means of magnets.

Dutch Pat. 100,332 discloses the mounting of an electrode by means of a metal magnet, for example, to a steel object protected against corrosion in an electrolyte. The electrode used according to this patent is a sacrificing anode, which is secured to the object to be protected by means of a metal magnet, and is electrically connected to the object to be protected inter alia by means of the metal magnet.

By securing the sacrificing anode to the object to be protected by means of a metal magnet, the replacement and/or renewal of the anode and of the metal magnet is a simple operation, while it is not necessary to equip the wall to be protected of the object with special fastening means.

It has been found, however, that it is not so simple to secure a sacrificing anode to a metal magnet, and that the fitting of the sacrificing anode to the object to be protected by means of this metal magnet is not satisfactory in all cases.

Such an arrangement has many disadvantages, and the problems inherent to the cathodic protection are mostly not solved or only partly so.

The disadvantages of the known method of securing an anode by means of a metal magnet, are inter alia the following.

(1) Hitherto only metal magnets have been used for this purpose, and these especially in the horseshoe form. These metal magnets are generally made of a metal alloy consisting of steel, nickel, cobalt, aluminium etc. If the electric potential of such a metal magnet is measured in sea-water relative to ship's steel, there appears to be an important difference in potential in favour of the magnet or in favour of the ship's steel to be protected, by which strongly corrosive effects are generated. This corrosion-promoting potential of these metal magnets may sometimes be 220 millivolts and more relative to the object to be protected so that, if through unforeseen conditions the anode does not function or insufficiently so, this metal magnet may locally effect strongly corrosive phenomena, which is very detrimental to the metal magnet or to the object to be protected, e.g., ships hulls, tank-walls etc.

(2) The metal magnets of high alloy steel referred to above are used with sacrificing anodes because these metal magnets effect the direct electric contact with the object to be protected. To this effect, it is naturally desirable that there is maintained an electric transition resistance as low as possible, for which reason the pole shoes and the object to be protected should be kept free of oxides etc. It would be expected that such an electric contact could be very well maintained so long as the sacrificing anode is secured to the magnet and the pole shoes of the metal magnet are in contact with the object to be protected. Contrary to this expectation, practice has shown that corrosion phenomena occur between these pole shoes and the object to be protected, so that the electric conduction becomes inadequate and the attraction of the metal magnet relative to the object is considerably reduced. This phenomenon is to be ascribed to the circumstance that, however smooth the pole shoes of the metal magnet and the surface on which the metal magnet is mounted may be, there will still always be a water film between them, and a greater amount in the ever-present scratches and roughnesses. Although the sacrificing anode will supply its protective energy, this anode cannot sufficiently exert its influence in the interspace between the pole shoes and the surface to be protected, because the potential difference between the pole shoes of the metal magnet and the ship's steel locally inhibits the cathodic protection, so that corrosion occurs. This corrosion may after some time be such that pit-corrosion occurs in one of the two contacting surfaces, the pits being in the long run filled with rust, so that the electric conduction becomes insufficient and the magnetic attraction is reduced. As a consequence, the object is "under-protected" and further corrosion occurs, which may grow to such an extent that the anode and the metal magnet comes off the object and the cathodic protection stops entirely.

(3) In the high-alloy metal magnet, selective self-corrosion may occur which renders it unfit for use, so that one of the attractions of this manner of securing, namely, an economic and continuous fixation, is lost.

(4) The existing metal magnets are very difficult to process, and, for example, are not easily made in a compact and streamline form. Horseshoe magnets create cumbersome vortices at some velocity of the ship, and, owing to their form, they are as it were forced off the ships hull. Streamline magnets are very desirable, it is true, for use upon the ships hull, because they offer little resistance in the navigation, but they are difficult to make because high-alloy metal magnets are not easily processed and made compact.

(5) The existing metal magnets are difficult to make or to assemble into units having a high magnetic power, so that only electrodes of comparatively small size and low weight can be used, which excludes their use in ships of some size.

(6) The existing high-alloy metal magnets have the property that in mounting, when they are dropped or struck against other objects, they strike sparks, so that their use in fire-hazardous spaces (e.g. oil tankers) must be considered impossible.

(7) The storage of the known metal magnets must be regarded as very difficult, because, if the magnetic poles are not closed, the magnets soon lose their magnetism. Shutting off the magnet poles when the electrode is already mounted to the magnet, presents difficulties in practice for the storage.

(8) The very high-alloy steel magnets are very difficult to process and as a consequence, a good form of mounting for sacrificing anodes of some size is very difficult to find.

(9) Experiments have shown that the existing metal magnets rapidly loose their magnetic power when they are subjected to vibrations as occur for example in a ship.

(10) The method of securing electrodes by means of metal magnets can only be used for mounting sacrificing anodes, because in this case the current is directly passed from the sacrificing anode to the surface to be protected. In the cathodic protection by the impressed voltage technique, the fixation by means of a metal magnet could only be used if it would be possible for the anode to be mounted to the metal magnet in electrically insulated condition, which requirement, however, can hardly, if at all, be met.

It is an object of the present invention to remove the disadvantages of the prior method of securing electrodes by means of metal magnets, and to provide a magnetic fixation of electrodes which can be successfully used in almost all cases.

To this end, according to the invention, use is made of an electrode system comprising at least one magnet of a material which is corrosion-resistant in the electrolyte.

According to the invention, the electrode system comprises at least one magnet of a material which is electrically conductive.

According to the invention, the electrode system may comprise at least one magnet unit of ceramic material.

Magnet units of this ceramic material are here understood as being magnets consisting of mixtures of oxides, such as e.g. iron-barium oxides, iron-lead oxides, which are well mixed and subsequently sintered to mechanically very strong bodies and then after magnetization form magnets of exceptional strength and life. These ceramic magnets are not electrically conductive, possess no potential relative to the metal they are to protect, have a resistance of about 100,000 ohms per cm. and more and are further entirely resistant to corrosive electrolytes.

Although such ceramic magnets have been made in large quantities for all sorts of purposes since 1946, it is, according to the invention, for the first time proposed to use the exceptionally good properties of these magnets for mounting electrodes on surfaces to be protected. The favourable properties of these ceramic magnets for the purpose according to the invention may be summarized as follows:

(1) They do not possess a potential relative to the surfaces to be protected so that there can never occur an activated corrosion around or under the magnet.

(2) The ceramic magnets allow of being constructed in combination with electrically conductive members permanently maintaining the ideal contact with the object to be protected, and which do not have any adverse difference in potential relative to the object to be protected.

(3) The magnetic attraction of these ceramic magnets is ensured for scores of years both in open and in closed condition, so that a stable attachment to the object to be protected is obtained.

(4) The magnetic attraction is not reduced by the vibrations of, for example a ship, because these very ceramic magnets are particularly strongly resistant to vibrations and to other forms of mechanical loads.

(5) Since no corrosion can occur between the ceramic magnet and the object to be protected, no magnetic losses can arise as a result of this, and undesirably reduce the attraction of the ceramic magnets to the object, so that the magnet will not come off, with all adverse effects of this.

(6) The ceramic magnets allow of being made in all possible shapes, and of being assembled from a plurality of small units to one large whole having a very strong magnetic attraction, should this be desired. The ceramic material is easily processed, so that the necessary streamline form can be made. In the case of, for example, navigating vessels cathodically protected in this manner by means of an electrode system according to the invention, unnecessary resistance in the water is prevented, and the magnet, too, will not encounter extra loads in view of which the capacity of the magnet should be made unduly high.

(7) When they are dropped, struck or subjected to other impact contacts with rusty iron, the ceramic magnets have no tendency to strike sparks, so that fire hazard in, for example, tankers is prevented.

(8) By virtue of the structural possibilities with ceramic magnets and the possibilty of assembling strong magnet systems from smaller units of these magnets and to shape the same as desired with easily processed metal capable of forming a good anchorage for the electrode, a strong electrode-magnet system is obtained, which provides an excellent cathodic protection, is easily mounted and can be economically replaced.

(9) The magnetic power of the ceramic magnets can be reinforced considerably by a combination with other ferromagnetic materials which, as regards their potential are not detrimental to the surfaces to be protected either.

(10) The combination of ceramic magnets per se, or in conjunction with ferromagnetic materials of the same lower potential than the object to be protected, a good magnetic adherence and proper electric contact is after a short time even obtained on a rusty base. This is caused by the fact that rust, which consists of a loose mixture of $Fe_2O_3$ and $FeOH$, by the contact with the system according to the invention and under the influence of the magnetic force thereof, is in an electrolyte-like, for example, sea-water, after a short time converted into strongly ferromagnetic $Fe_3O_4$, which adheres well to the metal base and is moreover a good electric conductor. No other form of attachment but a magnetic one could effect this reaction.

According to the invention one magnet unit may have the form of a flat disc.

According to the invention, the disc-shaped magnet unit may be provided with a central hole.

Further, according to the invention the central hole in the disc-shaped magnet unit may be threaded.

According to the invention one magnet unit may be sandwiched between ferromagnetic members which direct, bundle and/or reinforce the magnetic power of the magnet units.

Furthermore, according to the invention, the areas of the ferromagnetic members having the magnet units between them may be in excess of the areas by which the magnet units are in contact with the ferromagnetic members.

Furthermore, according to the invention, the magnet unit and the ferromagnetic members may be kept together by means of electrically conductive fasteners.

According to the invention, the fasteners may be spaced from the magnet units.

Furthermore, according to the invention, a plurality of magnet units may be combined to a magnet system, each pair of adjacent magnet units having a ferromagnetic member between them.

Furthermore, according to the invention, all the electrically conductive components of the magnet system which are in direct contact with the object to be protected cathodically may have an equal or more negative potential than the potential of this object.

According to the invention, the threaded opening of the ceramic magnet unit may fit a pin-shaped, threaded projection of a reinforcing frame of an electrode, the thickness of the disc-shaped ceramic magnet unit being in excess of the length of the threaded portion of said pin-shaped projection.

According to the invention, at least one of the ferromagnetic members of the magnet system composed of ceramic magnet units and ferromagnetic members may be provided with a threaded opening fitting a pin-shaped, threaded projection of a reinforcing frame of the electrode.

According to the invention, the fastener for keeping the system of ceramic magnet units and ferromagnetic members together may be provided with threaded openings, by means of which the electrode can be connected with the fastener.

According to the invention, the magnet system may be accommodated in a space in the preferably streamlined electrode.

According to the invention, the magnet system may be surrounded by synthetic material except for the pole surfaces.

According to the invention, the electrode and the magnet system may extend in alignment with each other and be separated by an insulating screen.

The invention will be further explained with reference to the drawings, illustrating, by way of example, some embodiments of the invention. In the drawings:

FIGS. 1 and 1a show diagrammatically the use of an electrode system according to the invention, the electrode being a sacrificing anode;

FIG. 2 shows diagrammatically the use of the electrode according to the invention for the cathodic protection by means of the impressed voltage technique;

FIGS. 3 and 3a show an embodiment of an electrode system resulting in a large cathodic spread; and FIG. 4 shows diagrammatically an embodiment of an electrode system according to the invention having a streamlined electrode.

Referring to FIG. 1, the steel ship's hull 1 is cathodically protected by a sacrificing electrode 2, which is fastened to the ship's hull by means of the magnet unit 3.

According to FIG. 1, the electrode system consists of a sacrificing anode 2 and a ceramic magnet unit 3. The sacrificing anode is reinforced by a reinforcing bar 4 embedded in the material of the anode to project from the material of the anode by an end 5, which is provided with a screw thread.

The ceramic magnet unit 3 has the form of a flat disc (FIG. 1a), which is magnetized in the direction of its thickness. The disc 3 has a central threaded opening 6 fitting the threaded end 5 of the reinforcing bar 4. The threaded length of the end 5 is shorter than the thickness of the disc 3, so that the terminal face 7 of the reinforcing bar does not project from the opening of the disc and may extend into the opening 6, for example, up to halfway the thickness of the disc 3. The end 5 of the reinforcing bar is provided with a contact terminal 8. The electrode system is mounted on the surface of a body 1 to be protected against corrosion, such as the steel hull of a ship, and is located below the level 51 of the sea-water.

The anode 2, which consists, for example, of magnesium, is connected by way of the reinforcing bar 4, which acts as a conductor, the contact terminal 8, conductor 9, measuring instrument 10, variable resistor 11 to the hull of the ship 1. By means of the measuring instrument 10 the operation of the apparatus can be checked, and by varying the resistor 11, it can be varied and adjusted.

This construction can very well be used for protecting the painted hull of laid-up ships, the sacrificing electrode preferably consisting of magnesium. The ceramic magnet forms in this respect an ideal possibility of attachment, because magnesium has so high a potential relative to steel that over-protection and damage to the paint would occur, if the magnesium electrode should be mounted on the hull of the ship by means of a metal magnet. Since, according to the invention, use is made of a ceramic magnet, the electric connection of the sacrificing electrode to the ship's hull is effected by way of the conductor 9 connected to the reinforcing bar 4 and the variable resistor 11, which presents a possibility for adjustment.

FIG. 2 shows an embodiment of an electrode system for cathodic protection by means of the impressed voltage technique. The electrode system consist of the ceramic magnet unit 13, which is disc-shaped and streamlined, and provided with a threaded opening 15, similarly to the embodiment of the ceramic magnet shown in FIG. 1. The electrode 14 is likewise streamlined and may consist of an inert material, such as for example, platinum, platinum-coated titanium, rhodinated tantalum. The pin-shaped threaded projection 16 of the electrode 14 is screwed in the opening 15 of the magnet unit. The projection 16 has a contact terminal 17. The threaded length of the projection is shorter than the thickness of the disc-shaped ceramic unit 13, so that the end does not project from the opening 15 of the unit. The electrode system is mounted on the surface of the object 12 to be protected against corrosion below the level 52 of an electrolyte. The electrode 14 is connected by means of the conductor 18 connected to the contact terminal 17 to the positive terminal of a source of direct current 19, the negative terminal of this source of direct current being connected via conductor 20 to the object 12 to be protected. In the same manner as according to FIG. 1, a variable resistor and a measuring instrument may be accommodated in the conductor 18 according to FIG. 2. The ceramic unit 13 performs the functions of fastening the electrode 14 to the object 12 to be protected and electrically insulating the electrode 14 from the object.

FIG. 3 shows an embodiment of an electrode system according to the invention for mounting an electrode on the inner walls of tankers for carrying, for example, petroleum, or filled with sea-water as ballast.

The magnet system in this embodiment comprises two parallelepipedon-shaped ceramic magnet units 21 and 22 which enclose an auxiliary member or pole piece 23 of feromagnetic material and are themselves enclosed by the ferromagnetic auxiliary members 24 and 25 which are pole pieces which function as pole shoes. The flat ceramic magnet units are magnetized in the direction of their thickness, the two equal poles of the ceramic magnet units being directed towards each other and away from each other, respectively. The auxiliary members, which consist of ferromagnetic material which has good electrical conductivity, have their edges projecting from the enclosed ceramic magnet units, the whole being kept together by the bolts 26 and 27, which at the same time serve as electrically conductive connections between the auxiliary members. As appears from FIG. 3a, which shows a cross-section on the line IIIa—IIIa in FIG. 3, the bolts 26 and 27 are spaced from the ceramic magnet units to prevent the magnetic circuit to be closed by way of these bolts.

For further preventing the closure of the magnetic circuit via the bolts 26 and 27, these bolts may be made of non-ferrous metal. The auxiliary members are in contact with the surface 28 to be protected, and the edges by which they project from the enclosed ceramic magnet units may be suitably adapted to the form of the surface to be protected, e.g. the hull of a ship. In this connection, the edges may be of the same shape as the surface to be protected they are in contact with, or, alternatively, the extent to which they project beyond the edges of the ceramic magnet units may be varied according to the shape of the surface to be protected. The intermediate auxiliary member 23, which is thicker than the other auxiliary members 24 and 25, is provided with a threaded opening 29, into which the threaded pin-shaped projection 30 of a reinforcing frame 31 is screwed. The pin-shaped projection 30 is provided with a contact terminal 53. A screen 33 of insulating material, fastened to the magnet system simultaneously with the electrode 30 is for obtaining a greater spread of the cathodic effect of the electrode 32. The whole magnet system, except for the pole surfaces of the auxiliary members in contact with the surface 28 to be protected, is surrounded by insulating material 34. In this connection, the material of the auxiliary members 23, 24, 25 in contact with the surface to be protected is preferably of the same potential in the electromotive series as the potential of the material of the surface of the object to be protected, so that, if the electrode material 32 should no longer be there, no corrosion-inciting potential can be created between the magnet system and the surface to be protected.

This embodiment may be extended by more ceramic magnet units and ferromagnetic auxiliary members practically without limits, so that a very powerful magnetic system is obtained. According to FIG. 3, the ferromagnetic auxiliary members 23, 24 and 25 are all electrically conductively interconnected by the bolts 26 and 27 which keep the entire magnet system together. In this connection, the auxiliary members form an electrically conductive connection between the electrode, which may be a sacrificing anode, and the surface of the object 28 to be protected. It is possible, however, for example, by inserting a thin insulating plate between the magnet system and the surface to be protected to have the electrode system electrically insulated from the surface to be protected, and, by means of the contact terminal 53, to connect the electrode system as illustrated in FIGS. 1 and 2. The electrode system may be electrically insulated from the wall to be protected in a different manner by increasing the openings in the auxiliary member 23 in accordance with the dotted lines 56 in such a manner that the bolts 26 and 27 do not touch this auxiliary member and by further shifting the auxiliary member 23 over a small distance to the right according to the dotted line 54 in FIG. 3, so that this auxiliary member 23, to which the electrode 32 is fastened, does not come into contact with the surface to be protected. In the case that the magnet system is composed of a plurality of ceramic magnet units, at least more than two, a very short distance between one or more auxiliary members and the surface to be protected has little influence on the total attraction exerted by the ceramic magnet system.

In the embodiment according to FIG. 4, the electrode system comprises two ceramic magnet systems 35 and 36, which are accommodated in the recesses 37 and 38 of a streamline electrode 39. The ceramic magnet system 35, like the magnet system 36, not shown, is composed of disc-shaped ceramic magnet units 40, 41, which have a central opening 42. The ceramic magnet units are stacked with insertion of a ferromagnetic member 43 and are sandwiched between the ferromagnetic terminal members 44 and 45. The ferromagnetic members have an opening for allowing the passage of a fastener 46 having threaded ends, the nuts 47 and 48 applied on to the ends keeping the stack of the ceramic magnet units and the ferromagnetic members together. The ferromagnetic members have their lower edges projecting beyond the ceramic magnet units, so that only the pole surfaces of the ferromagnetic members come into contact with the surface of the body 49 to be protected. The ferromagnetic members preferably have the same potential in the potential series as the potential of the material of the body to be cathodically protected.

The ferromagnetic members are electrically conductively interconnected by the fastener 46. The ceramic magnet units have an opening 42 of such a large diameter that the fastener is allowed to pass with ample play to prevent this member from closing the magnetic power current. In order to prevent such closure of the magnetic power current, the fastener 46 may consist of non-ferrous metal. According to the drawing, the magnet system comprises only two ceramic magnet units. If, however, the space in the recess 37 is increased accordingly, the magnet system may be extended to a stack of more ceramic magnet units, each time with insertion of a ferromagnetic member.

The terminal faces of the fastener 46 have threaded bores by means of which the magnet system is mounted to the electrode 39. The recesses 37 and 38 may be filled with plastic material which does not cover the pole surfaces of the ferromagnetic auxiliary members.

What is claimed is:
1. A method of cathodically protecting a ferrous metal object against corrosion in an electrolyte, comprising the steps of providing a magnet means having a ceramic magnet portion, attaching at least one pole shoe of an electrically conductive material having an equal or more negative potential than the object to be protected to the magnet means in a manner such that said pole shoe constitutes the part of said magnet means which contacts the object to be protected, mounting on and electrically connecting to the pole shoe a sacrificial anode which constitutes said protective electrode, and placing said magnet means with the protecting electrode thereon on the object to be protected and in the electrolyte against which the object is to be protected by placing a surface of the pole shoe in contact with the object, whereby the protecting electrode is secured tightly through the magnet means to the object to be protected, and the magnet means does not accelerate the corrosion of the object to be protected after the protecting electrode is consumed.
2. A method as claimed in claim 1 in which the electrolyte is a halogen-containing electrolyte, and the ceramic magnet comprises a mixture of barium oxide and iron oxide and is resistant to the halogen-containing electrolyte.
3. A method as claimed in claim 1 in which the electrolyte is a halogen-containing electrolyte, and the ceramic magnet comprises a mixture of lead oxide and iron oxide and is resistant to the halogen-containing electrolyte.
4. A method as claimed in claim 1 in which the ceramic magnet has a resistance of at least 100,000 ohms per cm. of length.
5. A method as claimed in claim 1 further comprising covering all of the surfaces of said magnet and the pole shoe other than the surface thereof which is to lie against the object to be protected with a synthetic electrolyte resistant material.

References Cited

UNITED STATES PATENTS

| 669,922 | 3/1901 | Gottlob | 204—196 |
| 2,776,941 | 1/1957 | Wagner | 204—196 |
| 2,837,483 | 6/1958 | Hakker et al. | 252—62.63 |
| 2,910,419 | 10/1959 | Preiser et al. | 204—196 |
| 2,954,257 | 9/1960 | Besuch et al. | |
| 3,081,252 | 3/1963 | Preiser et al. | 204—196 |

FOREIGN PATENTS 908,310    10/1962    Great Britain.

OTHER REFERENCES

Justin, "Official Gazette," vol. 659, p. 590, Oct. 6, 1952.

TA-HSUNG TUNG, Primary Examiner

U.S. Cl. X.R.

204—197, 196, 286, 297; 248—206